G. P. KIRK.
AUTOMATIC ANIMAL TRAP.
APPLICATION FILED JUNE 22, 1914. RENEWED MAR. 13, 1916.

1,180,654.

Patented Apr. 25, 1916.
2 SHEETS—SHEET 1.

Witnesses:—
Louis W. Gratz.
J. M. Mansfield.

Inventor
George P. Kirk.
by Townsend & Graham
his Attorneys.

THE COLUMBIA PLANOGRAPH CO., WASHINGTON, D. C.

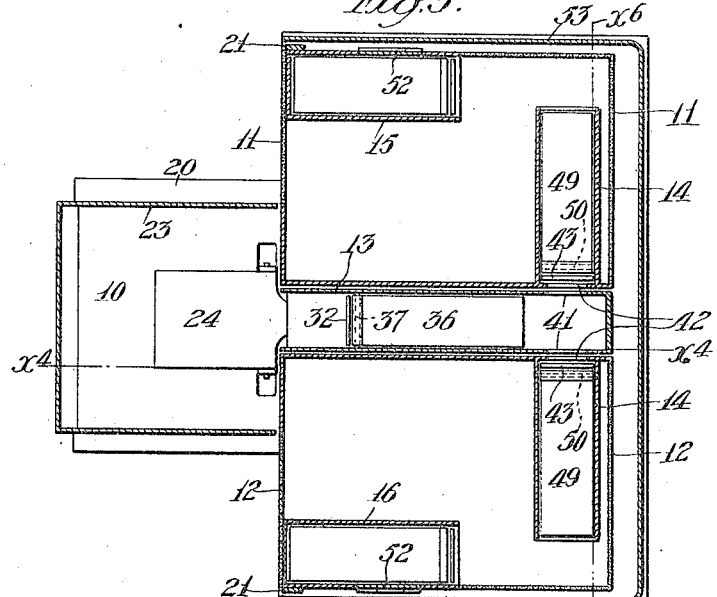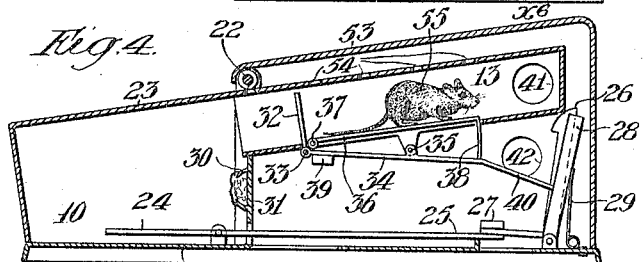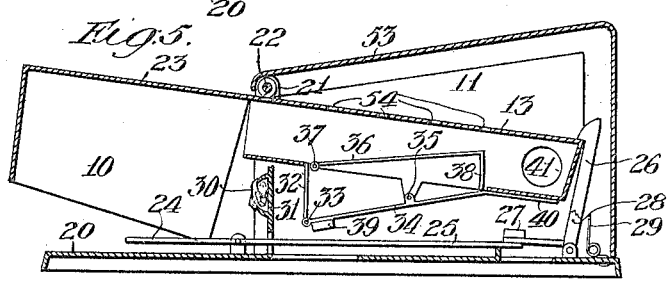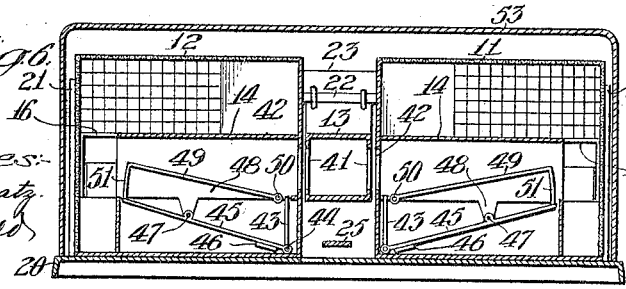

UNITED STATES PATENT OFFICE.

GEORGE P. KIRK, OF LOS ANGELES, CALIFORNIA.

AUTOMATIC ANIMAL-TRAP.

1,180,654.   Specification of Letters Patent.   Patented Apr. 25, 1916.

Application filed June 22, 1914, Serial No. 846,703. Renewed March 13, 1916. Serial No. 83,974.

*To all whom it may concern:*

Be it known that I, GEORGE P. KIRK, a citizen of the United States, residing at Los Angeles, in the county of Los Angeles, State of California, have invented a new and useful Automatic Animal-Trap, of which the following is a specification.

The invention relates to animal traps, and the principal object is to provide a trap which is continuous in operation, each animal trapped setting the trap for the next comer.

A further object is to provide means for securely locking the parts and preventing an animal from deranging the operation.

A further object is to provide means for preserving the animals after they are trapped so that a large animal will not eat a smaller one.

The trap illustrated may be of any size and will capture any animal which may be taken in the common forms of traps. It is particularly adapted to catch small fur bearing animals.

Further objects and advantages will be evident hereinafter.

Figure 1:
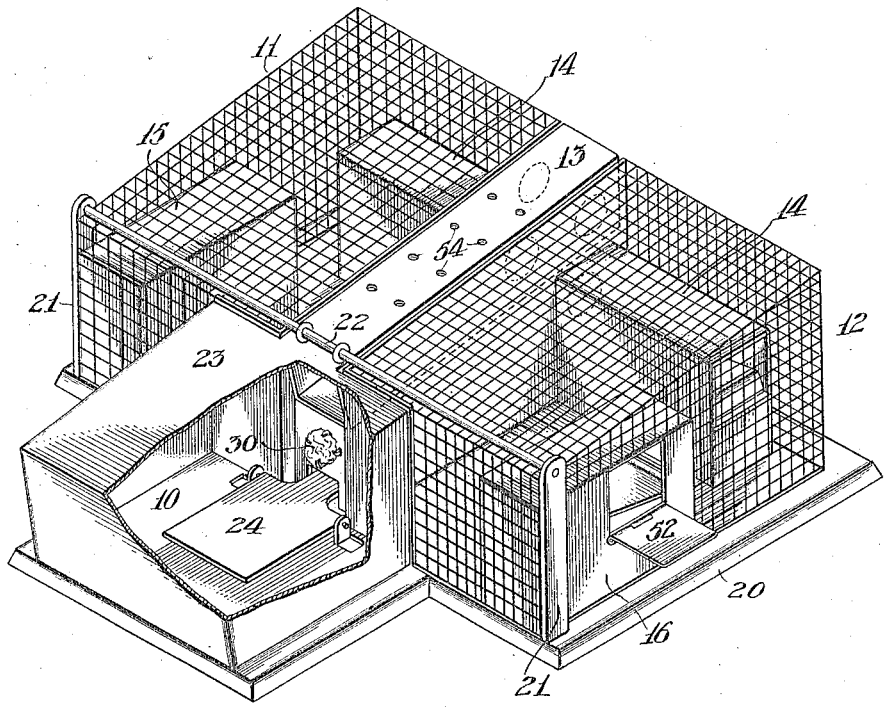
Figure 2:
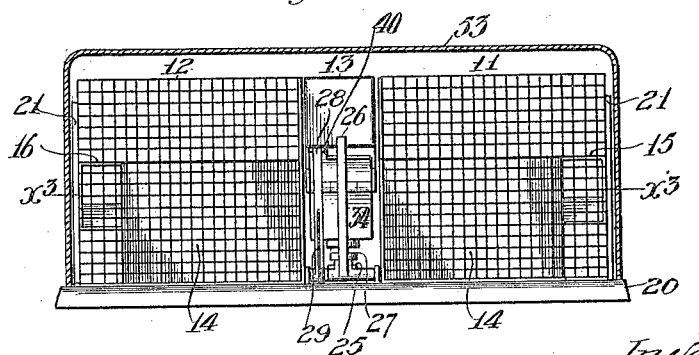

Referring to the drawings which are for illustrative purposes only, Figure 1 is a perspective view of the trap. Fig. 2 is an end elevation, the cover being shown in section. Fig. 3 is a sectional plan on the plane $x^3$—$x^3$ of Fig. 2. Fig. 4 is a section on the plane $x^4$—$x^4$ of Fig. 3, the primary means being in the sprung position. Fig. 5 is a section on the same plane as Fig. 4, the primary means being in the set position. Fig. 6 is a section on the plane $x^6$—$x^6$ of Fig. 3.

The trap broadly considered consists of an outer chamber 10 forming the primary trapping means and in which the animals are first caught and a pair of cages 11 and 12 and a runway 13 forming with its attached parts the reset means for the primary trapping means through which they enter the cages 11 and 12. Located in the cages 11 and 12 are automatic door structures 14 and cells 15 and 16.

Considered more in detail the trap consists of a base 20 upon which are mounted standards 21 which carry a shaft 22. Pivoted on the shaft 22 is a swinging member 23, the forward part consisting of three walls and a cover adapted to close down upon and cover the chamber 10. The rear portion of the swing member is extended to form the swinging runway 13 which is adapted to move up and down between the cages 11 and 12. Pivoted on the base 20 is the release plate 24, the rear end 25 of which extends under the runway 13 as shown in Figs. 4, 5 and 6. A trigger 26 is pivoted to the base 20 and is provided with a hook which latches over the top of the runway 13 when the trap is originally set as shown in Fig. 5. The trigger 26 is provided with a weight 27 which throws it into engagement with the swinging runway 13 and which extends out and is lifted by the end 25 of the release plate 24. A latch 28 is also pivoted to the base 20 and is provided with a spring 29 secured to the base 20 which tends to force it under the edge of the swinging runway 13, thus locking the runway in the position shown in Fig. 1. A bait receptacle 30 is provided being formed on an extension 31 of the base 20, this extension extending up under the runway 13 and helping to close in the chamber 10.

Located in the swinging runway 13 is an automatic door consisting of a door member 32 pivoted at 33 to a swinging plate 34. The swinging plate 34 is pivoted at 35 to the bottom of the runway 13 and a false floor 36 is pivoted at 37 to the sides of the runway 13. The false floor 36 has a projection 38 which extends down and engages the swinging plate 34, a weight 39 being provided on the plate 34 which tends to hold the parts in the position shown in Fig. 5. An extension 40 is formed on the swinging plate 34 extending out and engaging the latch 28 when the parts are in the position shown in Fig. 4. Openings 41 are provided on either side of the runway 13 and similar openings 42 are provided in the sides of the cages 11 and 12 on either side of the runway, the openings 41 being so placed that they register with the openings 42 when the trap is in the set position as shown in Fig. 5.

The automatic doors 14 in the cages 11 and 12 are similar in form to the parts 32 to 39 just described. They consist of a sliding door 43 pivoted at 44 to a swinging plate 45 which is provided with a weight 46 tending to hold the parts in the position shown in Fig. 6. The swinging plate 45 is pivoted at 47 to the sides 48 of the automatic door structure. A false floor 49 pivoted at 50 to the sides 48 is provided with a projection 51 engaging the swinging plate 45. The cells 15 and 16 are provided with parts similarly placed to the parts 43 to 51 just described. In the drawings, only two cells 15 and 16 are shown, doors 52 being provided on either side thereof. The cages 11 and 12 may be of any size and may be provided with any desired number of cells similar to 15 and 16. As the trap may be often set in snow or in locations where protection is desired, I find it advisable to place a cover 53 over the top thereof.

The method of operation of the invention is as follows: Suitable bait being placed in the bait holder 30 the trap is set in the position shown in Fig. 5. The animal enters the chamber 10 under the member 23 and steps upon the release plate 24 in his attempt to get the bait. This lifts the end 25 and the weight 27 releases the trigger 26. The member 23 is slightly heavier than the runway 13 and the trap swings over into the position shown in Fig. 4, thus confining the animal in the chamber 10. As soon as the trap is sprung in the position shown in Fig. 4, the latch 28 is forced under the end of the runway 13 by means of the spring 29, thus effectually locking the parts in the position shown in Fig. 2, so that no effort on the part of the animal can open the parts except as hereinafter described. The walls of the chamber 10 are preferably of solid material and the animal is in the dark after the trap is sprung, the only light apparent to him being that coming through a series of small perforations 54 in the top of the runway 13. In his attempt to escape the animal therefore enters this runway and passes through it, assuming the position shown at 55 in Fig. 4. As he passes upon the false floor 36 his weight causes it to fall into the position shown in Fig. 4, and the projection 38 strikes upon the swinging plate 34 forcing the sliding door 32 up behind the animal, thus preventing him from going back into the chamber 10. As the swinging plate 34 moves into the position shown in Fig. 4 the extension 40 thereon strikes upon the latch 28 forcing it into the position shown in Fig. 4. The weight of the animal is then sufficient to swing the parts into the set position as shown in Fig. 5, the trigger 26 being forced over by the weight 27 setting and locking the trap in position for the next animal. As soon as the animal vacates the false floor 36 the weight 39 forces the parts 32 to 40, inclusive, back into the position shown in Fig. 5. The animal leaves the runway 13 through the openings 41 and 42 and passes into either of the automatic door structures 14. The proportion of the parts 43 to 51, inclusive, is such that as it steps upon the false floor 49 the projection 51 thereon strikes on the swinging plate 45 and forces the sliding door 43 up behind the animal thus preventing it from returning through the opening 42. Its only escape therefor is into the cages 11 and 12. Should he desire to return through the automatic door mechanisms it will be necessary for him to pass over the false floor 49 thus forcing the door 43 up into his path and preventing him from passing through the opening 42.

It is evident that as the trap is now set it is possible for another animal to enter and to pass through the various parts as has been described into the chamber 11 or 12. It is further evident that should a number of animals be confined in these cages for a considerable length of time that some of these animals might destroy the remainder especially where the trap is used as a fur trap and the animals are of different sizes. For the purpose of preserving fur bearing animals the cells 15 and 16 are provided. Any number of these cells may be placed in the cages 11 and 12. The cells have parts similar to the automatic door mechanisms 13 and 14, and openings similar to the openings 42 communicating with the interior of the cells, which are, however, entirely closed boxes except for this opening. Doors 52 are cut in the side of the cells 15 and 16 through which the animal may be removed by the trapper. The sliding doors in the cells 15 and 16 are actuated by false floors, swinging plates, and weights exactly similar to those already described in connection with the automatic door mechanisms. After the animal has passed into the cages 11 and 12, in seeking for a method of escape, he enters one of these cells, the door of which is closed by the false floor, thus effectually retaining him therein and protecting him from any other animals which may enter the cages. It will be noted that the trap is continuous in operation, one animal setting it for another, and by providing a sufficient number of cells each animal that enters is effectually trapped and preserved from those which enter later.

I claim as my invention:

1. In an animal trap a pivoted runway adapted to oscillate between a sprung position and a set position, the weight of the parts attached to said runway being so distributed that the runway tends to assume the sprung position, a trigger for restraining said runway in the set position, a latch for restraining said runway in the sprung position, means for actuating said trigger to allow said runway to assume the sprung position under the action of gravity, and release means whereby an animal in the runway can release the latch and allow the runway to assume the set position, said release means being so located that the animal at the instant it actuates said release means is in a position where its weight will cause said runway to assume the set position.

2. In an animal trap, a pivoted runway adapted to oscillate between a set and a sprung position, gravity means for causing said runway to assume the sprung position, trigger means for holding said runway in the set position, means whereby an animal may release said trigger means, latch means for restraining said runway in the sprung position, and means whereby said animal may release said latch means and simultaneously cause said runway to assume the set position.

3. In an animal trap, a pivoted runway adapted to oscillate between a set and a sprung position, gravity means for causing said runway to assume the sprung position, trigger means for holding said runway in the set position, means whereby an animal may release said trigger means, latch means for restraining said runway in the sprung position, a door for closing the entrance to said runway, means by which an animal in said runway may close said door, and means whereby said animal may release said latch means and simultaneously cause said runway to assume the set position.

4. In an animal trap, a pivoted runway adapted to oscillate between a set and a sprung position, gravity means for causing said runway to assume the sprung position, trigger means for holding said runway in the set position, means whereby an animal may release said trigger means, latch means for restraining said runway in the sprung position, a door for closing the entrance to said runway, and trip means operated by the weight of the animal in said runway beyond said door for closing said door and simultaneously releasing said latch.

5. In an animal trap, a pivoted runway adapted to oscillate between a set and a sprung position, gravity means for causing said runway to assume the sprung position, trigger means for holding said runway in the set position, means whereby an animal may release said trigger means, latch means for restraining said runway in the sprung position, a door for closing the entrance to said runway, a false floor in said runway, and means whereby the weight of an animal on said false floor closes said door and releases said latch.

6. In an animal trap, a pivoted runway adapted to oscillate between a set and a sprung position, gravity means for causing said runway to assume the sprung position, trigger means for holding said runway in the set position, means whereby an animal may release said trigger means, latch means for restraining said runway in the sprung position, a door for closing the entrance to said runway, and trip means operated by the weight of the animal in said runway beyond said door for closing said door and simultaneously releasing said latch, the trip means being so located that weight of the animal causes said runway to assume the set position after said latch is released.

7. In an animal trap, a pivoted runway adapted to oscillate between a set and a sprung position, gravity means for causing said runway to assume the sprung position, trigger means for holding said runway in the set position, means whereby an animal may release said trigger means, latch means for restraining said runway in the sprung position, a door for closing the entrance to said runway, a false floor in said runway, and means whereby the weight of an animal on said false floor closes said door and releases said latch, said false floor being so located in said runway that the weight of the animal thereon causes said runway to assume the set position after said latch is released.

In testimony whereof, I have hereunto set my hand at Los Angeles, California, this 16th day of June, 1914.

GEORGE P. KIRK.

In presence of—
FRED A. MANSFIELD,
FRED W. HARRIS.

Copies of this patent may be obtained for five cents each, by addressing the "Commissioner of Patents, Washington, D. C."